(12) United States Patent
Schoppe et al.

(10) Patent No.: US 10,180,837 B2
(45) Date of Patent: Jan. 15, 2019

(54) VERSION CONTROL AND MANAGEMENT

(71) Applicant: salesforce.com, inc., San Francisco, CA (US)

(72) Inventors: Owen Winne Schoppe, South San Francisco, CA (US); John Fredric Vogt, Jr., San Francisco, CA (US); Simon Toens, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 318 days.

(21) Appl. No.: 14/803,418

(22) Filed: Jul. 20, 2015

(65) Prior Publication Data

US 2017/0024445 A1    Jan. 26, 2017

(51) Int. Cl.
G06F 17/30    (2006.01)
G06F 8/71     (2018.01)
G06F 17/22    (2006.01)

(52) U.S. Cl.
CPC ............ *G06F 8/71* (2013.01); *G06F 17/2288* (2013.01); *G06F 17/30011* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |

(Continued)

OTHER PUBLICATIONS

TkCVS, TkCVS Version 8.2.3, Aug. 13, 2014, <http://web.archive.org/web/20140813033534/http://www.twobarleycorns.net/tkcvs.html>.*

(Continued)

*Primary Examiner* — Syed H Hasan
(74) *Attorney, Agent, or Firm* — Jaffery, Watson, Mendonsa & Hamilton, LLC

(57) ABSTRACT

Methods and apparatuses for version management. Information corresponding to multiple versions of a file is maintained in a database. The information includes one or more versions of the file and change data associated with the one or more versions of the file. In response to a request, a graphical user interface (GUI) is presented that includes a timeline with entries corresponding to one or more versions of the file. The entries have at least a graphical representation of changes made.

20 Claims, 8 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,442,718 B1* | 9/2016 | Wang ..................... G06F 8/71 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0212792 A1* | 9/2006 | White ............... G06F 17/3089 715/205 |
| 2008/0189679 A1* | 8/2008 | Rodriguez ................ G06F 8/34 717/105 |
| 2008/0209503 A1* | 8/2008 | Hess ..................... G06F 21/10 726/1 |
| 2009/0177744 A1 | 7/2009 | Marlow et al. |
| 2009/0327324 A1* | 12/2009 | Laflen ............... G06F 17/30312 |
| 2012/0042210 A1* | 2/2012 | Glaser ................ G06F 11/3684 714/38.1 |
| 2013/0019028 A1* | 1/2013 | Myers ................ G06F 17/2235 709/246 |
| 2016/0224327 A1* | 8/2016 | Angelotti ............ G06F 9/44521 |

OTHER PUBLICATIONS

Brandt, Version Control with tkCVS, Jun. 21, 2010, <http://web.archive.org/web/20100621180521/http://www.ing.iac.es/~docs/external/gnu/tkcvs.pdf>.*

Bessy, tkCVS—a GUI for the CVS Version Control System, May 26, 2011, <http://web.archive.org/web/20110526161843/http://www-csr.bessy.de/control/Soft/tkCVS/>.*

* cited by examiner

Version Control
Details of Job Posting
• Back to Version Control

Current State of Component
  Name: Job Posting
  Type: Custom Object

API Name: Job_Posting__c
Description: Postings on the general website for open job positions.

Component History

| 53 - Add custom fields ▼ | Revert to version 53 | vs. | Current State of Setup ▼ |

Amanda on 4/3/14                                              Recent Changes

```
-- 13 Lines Hidden -- Parent:<CustomObject>
 <fields>
  <fullName>Job_Title__c</fullName>
  <description>Title of the job posting.</de
  <inlineHelpText>This field contains te jo
  <label>Job Title</label>
  <length>256</length>
  <type>TextArea</type>
  <visiblelines>1</visiblelines>
 </fields>

<label>Job Posting</label>
<nameField>
 <label>Job Posting</label>
 <type>Text</type>
</nameField>
<pluralLabel>MyFirstObjects</pluralLabel>
<sharingModel>ReadWrite</sharingModel>
</CustomObject>
```

```
-- 13 Lines Hidden -- Parent:<CustomObject>
 <fields>
  <fullName>Job_Title__c</fullName>
  <description>Title of the job posting.</de
  <inlineHelpText>This field contains te jo
  <label>Job Title</label>
  <length>256</length>
  <type>TextArea</type>
  <visiblelines>1</visiblelines>
 </fields>
 <fields>
  <fullName>Candidates__c</fullName>
  <description>Candidates who applied to th
  <label>Candidates</label>
  <referenceTo>candidates__c</referenceTo>
  <relationshipLabel>candidates</relationsh
  <relationshipName>candidates__c</relation
  <type>MasterDetail</type>
  <reparentableMasterDetail>false</repareni
 </fields>
<label>Job Posting</label>
<nameField>
 <label>Job Posting</label>
 <type>Text</type>
</nameField>
<pluralLabel>MyFirstObjects</pluralLabel>
<sharingModel>ReadWrite</sharingModel>
</CustomObject>
```

VERSION CONTROL AND MANAGEMENT

TECHNICAL FIELD

Embodiments relate to version management and control. More particularly, embodiments relate to techniques for tracking code changes to manage versions and to provide version management.

BACKGROUND

Version control (also called revision control, source control, source code management, code management) provides the ability to manage changes to documents, programs, code and other types of electronic files. Various version control systems (VCSs) have been developed to help manage versions (and revisions) to documents and/or software applications. These systems typically include some description of the changes made between versions as well as the ability to revert to previous versions. However, these systems can be difficult to navigate and/or may not allow for constant availability.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is a simple example of a screen providing details of a revision.

FIG. 6 is an example version control interface in which a dependency has been identified.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Various embodiments of a system to track metadata code changes in a multitenant environment are described herein. In on embodiment organizations/tenants/customers, saved versions, and reverting back to previously saved versions are provided.

In various embodiments, these designs implement these requirements within the context of a single organization/tenant/customer. In one embodiment, these mechanisms provide a timeline view of versions and changes with an inline form to create new versions.

In one embodiment a "top card" provides information for the initial state (Current State) and can provide a list of recent changes that have not been committed as a version yet. In one embodiment, the following cards are committed versions showing what changes took place in that version compared to the previous.

In one embodiment, clicking a "Create a Version" button turns the top list of pending changes into a draft version with a form to complete details including title and description. In one embodiment, clicking "Cancel" would return the card to its initial state. In one embodiment, clicking "Commit Version" saves the changes as a new version, pushing it down the list.

In one embodiment, a new Current State of Setup card appears at the top that is initially empty, but tracks changes in the organization. In one embodiment, clicking revert results in a code change in the organization to bring it back to the state when that version was created. In one embodiment, the resulting changes show up in the Current State card. By doing the entire versioning interaction on a single card in the context of the timeline, users are able to visually track their progress and see the changes relative to other versions.

In one embodiment, a components tab shows every tracked component at a particular version. This lets users find a particular component quickly and check when it was changed last. In one embodiment, a details view shows details of a component including a comparison view (diff) between any two versions in which the component was changed. There can also be buttons to revert a single component to a previous version from this view.

In one embodiment, the time line view is a similar benefit to social media forms that let users compose the message in the context where it will appear. This approach differs from version control systems that separate the versioning/commit form from the timeline view.

Figure 1:
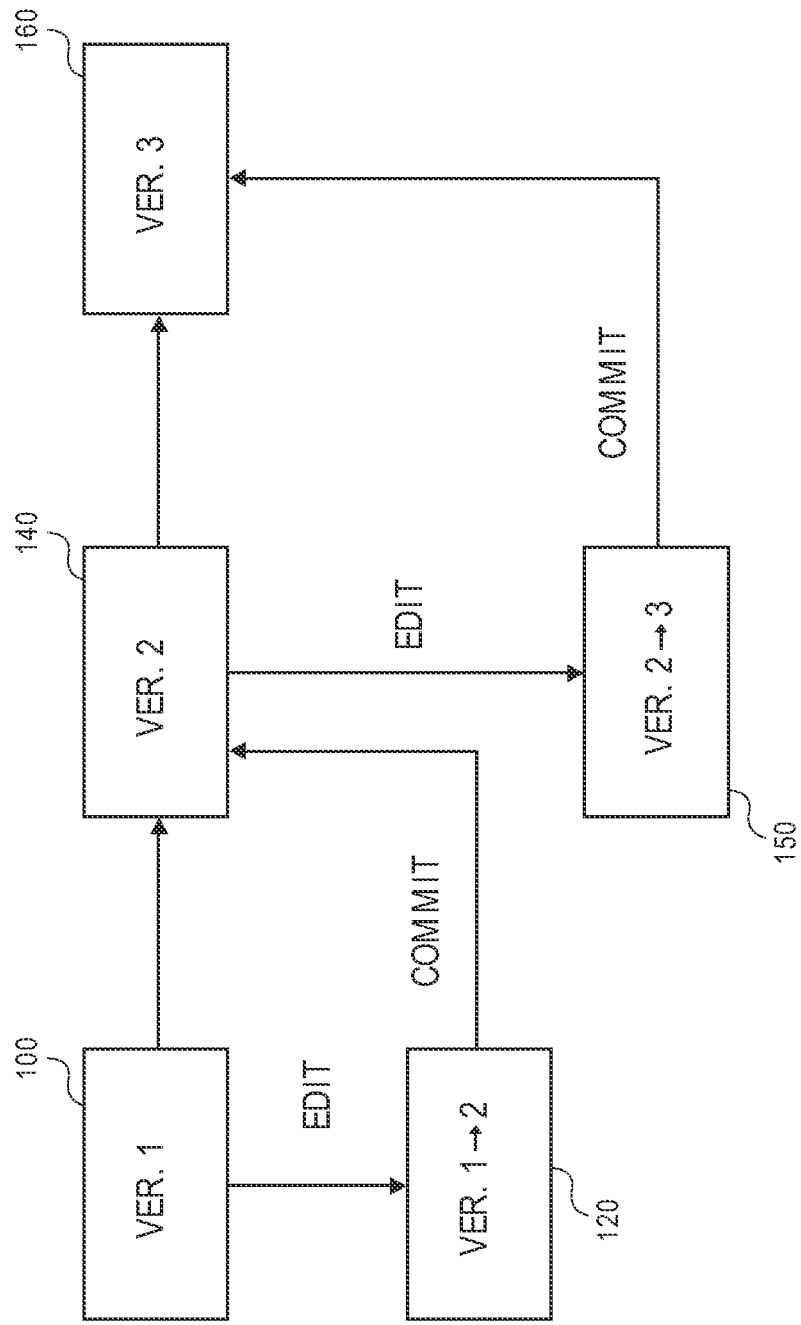
FIG. 1 is a conceptual diagram of a simple example of a version management process.

FIG. 1 is a conceptual diagram of a simple example of a version management process. The example of FIG. 1 is a simple example. Any number of versions can be managed in a similar manner. In one embodiment, full (committed) versions (e.g., 100, 140, 160) can be stored on a server that is available to multiple remote devices that may be used to create new/modified versions.

Version 1 (100 in FIG. 1) represents a version of a document/application/code that is being managed. Version 1 can be edited to create a modified or new version (120, Ver. 1→2 in FIG. 1). When the editing/modification is complete, the new version can be committed and can become Version 2 (140 in FIG. 1). Similarly, Version 2 can be edited to create a modified or new version (150, Ver. 2→3 in FIG. 1). When the editing/modification is complete, the new version can be committed and can become Version 3 (160 in FIG. 1).

Figure 2:
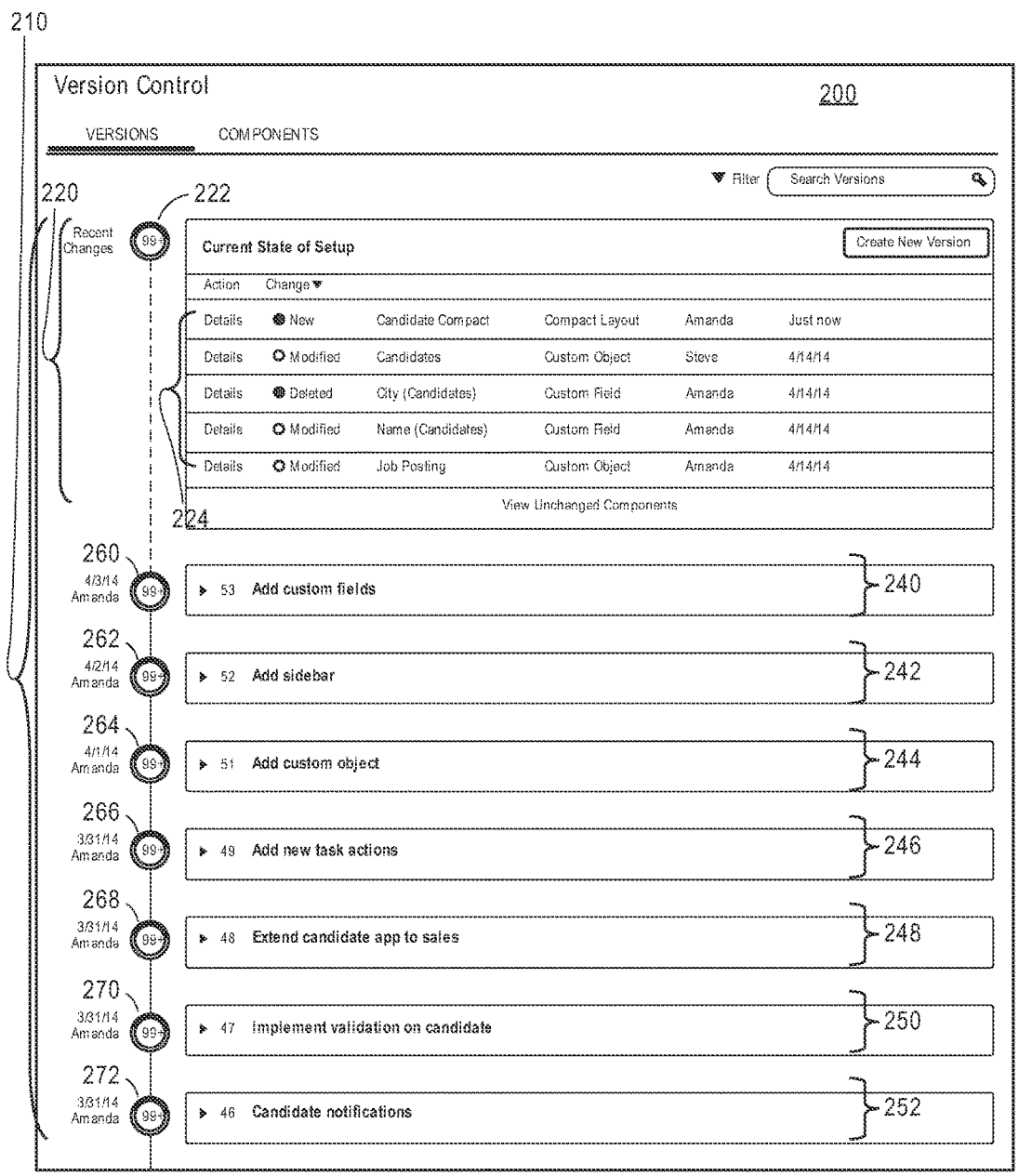
FIG. 2 is an example graphical user interface that can be utilized to provide improved version control and management.

FIG. 2 is an example graphical user interface that can be utilized to provide improved version control and management. The version control interface example of FIG. 2 provides more streamlined and efficient presentation of revisions than traditional version control mechanisms. The version control interface example of FIG. 2 can be presented as a timeline, much like a social media application.

In one embodiment, version control interface 200 includes timeline 210 that provides entries/posts corresponding to version changes. For example, recent changes 220 corresponds to a most recent change to the code/document/application being managed. In one embodiment, each entry or post includes a graphical representation (e.g., 222) of the changes made.

In one embodiment, a circle (or other object) can have color coding with colors and/or proportions/areas corresponding to changes. For example, a number can be included inside the circle indicating the extent of the changes (e.g., 99+ changes in the example of 222). Color may be used to indicate the type of changes, for example, red can indicate deleted text/code/sections/functionality, green can represent new text/code/sections/functionality and yellow can represent modified text/code/sections/functionality. Different colors and/or different change indications can also be supported.

In one embodiment, individual changes with information for the change (e.g., type, object/component modified, time/date, responsible party) can be provided. In one embodiment, additional details can also be accessed via the graphical user interface.

In one embodiment, other, (e.g., older) changes can be included in the timeline with either the same level of detail or less detail (240, 242, 244, 246, 248, 250, 252). In one embodiment, if less detail is provided, additional details are accessible via the graphical user interface. In one embodiment, each set of changes includes a graphical representation of the corresponding changes (e.g., 260, 262, 264, 266, 268, 270, 272).

FIG. 3 is a simple example of a screen providing details of a revision. In one embodiment, details of changes, for example, "Job Posting" from 224 in FIG. 1, can provide detail screen 300 that can provide new version 350 and old version 310. The example of FIG. 3 is code, but other types of documents can be similarly tracked. In one embodiment, change indicators 340 can indicate the type of change (e.g., additions "+", deletions "−"). Other information can also be provided. In one embodiment, button 370 (or other graphical mechanism) can be provided to revert to a previous version.

Figure 4:
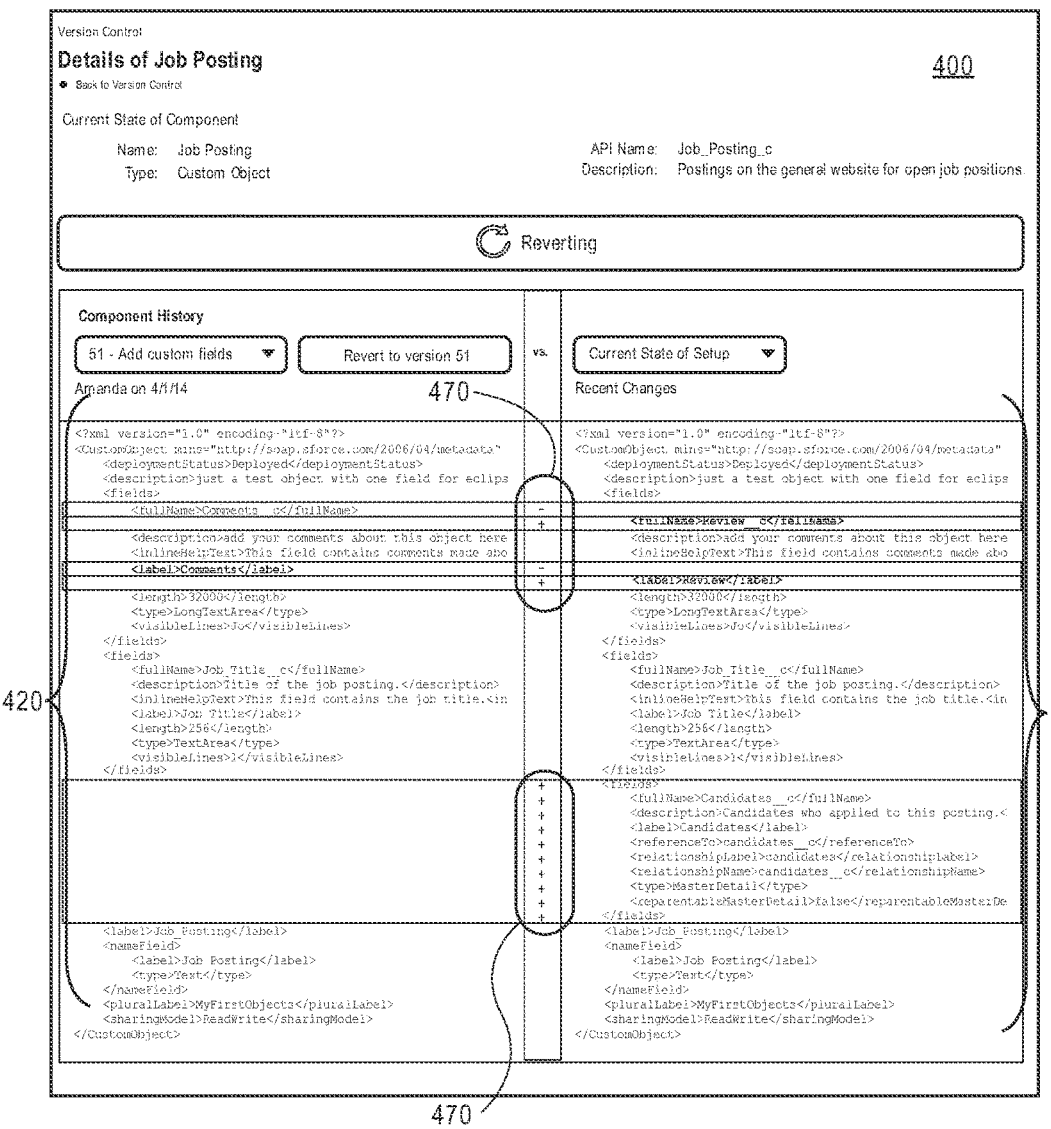
FIG. 4 is a simple example of a screen for reverting to a previous version.

FIG. 4 is a simple example of a screen for reverting to a previous version. In one embodiment, details of changes, for example, "Job Posting" from 224 in FIG. 1, can provide detail screen 400 that can provide new version 420 and old version 450. The example of FIG. 4 is code, but other types of documents can be similarly tracked. In one embodiment, change indicators 470 can indicate the type of change (e.g., additions "+", deletions "−"). Change indictors 470 indicate the lines of code that are changed when reverting to the selected earlier version.

Figure 5:
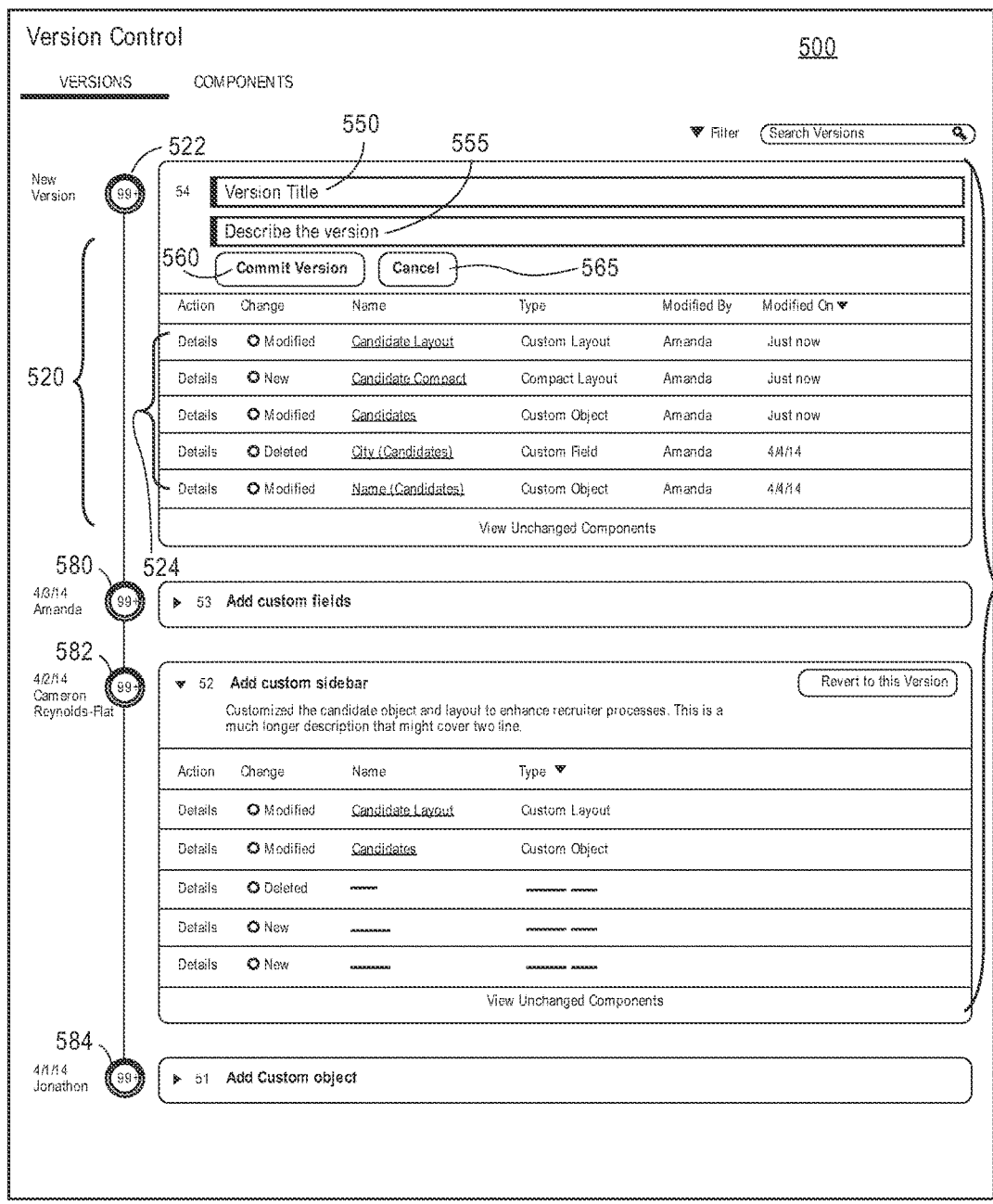
FIG. 5 is a simple example of a screen for creating a new version.

FIG. 5 is a simple example of a screen for creating a new version. The version control interface example of FIG. 5 provides more streamlined and efficient presentation of revisions than traditional version control mechanisms. The version control interface example of FIG. 5 can be presented as a timeline, much like a social media application.

In one embodiment, version control interface 500 includes timeline 510 that provides entries/posts corresponding to version changes. For example, new version 520 corresponds to a newly created version of the code/document/application being managed. In one embodiment, each entry or post includes a graphical representation (e.g., 522) of the changes made.

In one embodiment, a circle (or other object) can have color coding with colors and/or proportions/areas corresponding to changes. For example, a number can be included inside the circle indicating the extent of the changes (e.g., 99+ changes in the example of 522). Color may be used to indicate the type of changes, for example, red can indicate deleted text/code/sections/functionality, green can represent new text/code/sections/functionality and yellow can represent modified text/code/sections/functionality. Different colors and/or different change indications can also be supported.

In one embodiment, version control interface 500 provides fields for providing a version title 550 and/or version description 555. In one embodiment, version control interface 500 provides graphical controls (e.g., 560, 565) for committing the new version or canceling the action. Other controls and fields can also be provided.

In one embodiment, individual changes 524 with information for the change (e.g., type, object/component modified, time/date, responsible party) can be provided. In one embodiment, additional details can also be accessed via the graphical user interface.

In one embodiment, other, (e.g., older) changes can be included in the timeline with either the same level of detail or less detail (580, 582, 584). In one embodiment, if less detail is provided, additional details are accessible via the graphical user interface.

Figure 6:
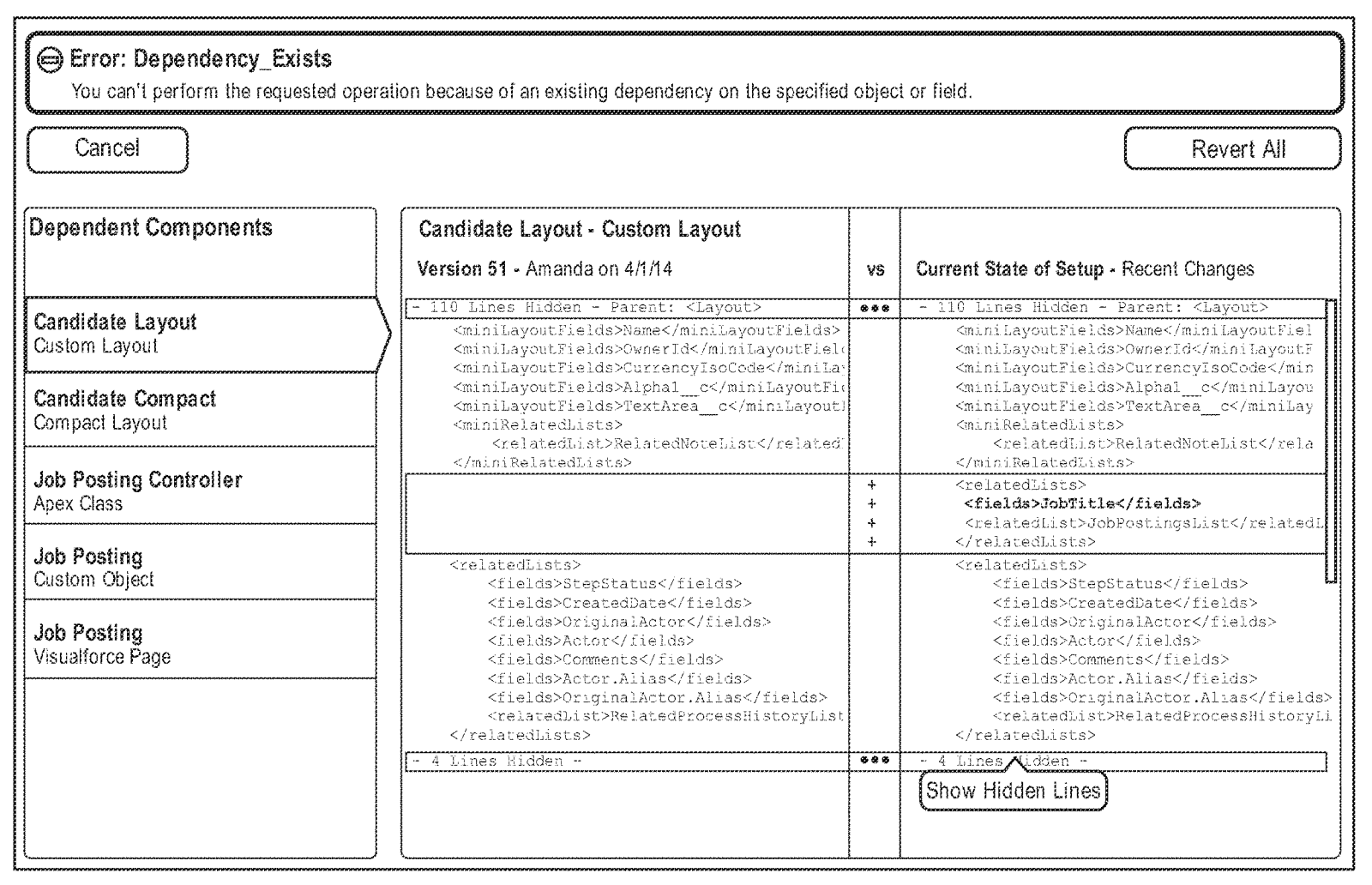

FIG. 6 is an example version control interface in which a dependency has been identified. As discussed in greater detail below, embodiments described herein search for dependencies that could result in non-functional elements if reverted to a previous version. In one embodiment, the version control system operates within an on-demand services environment and monitors dependencies so that reversion to previous versions does not result in a non-functional system. In one embodiment, the on-demand services environment is a multitenant environment and the version control system can provide the described functionality to one or more tenants of the multitenant environment. Various embodiments of on-demand and multitenant environments are described in greater detail below.

In one embodiment, prior to allowing a reversion to a previous version, the system may determine whether the attempted reversion will result in a fully functional version. In one embodiment, the system monitors dependencies to determine if functionality will be impaired by a particular reversion. In one embodiment, a reversion is not allowed if it will result in a loss of functionality.

Figure 7:
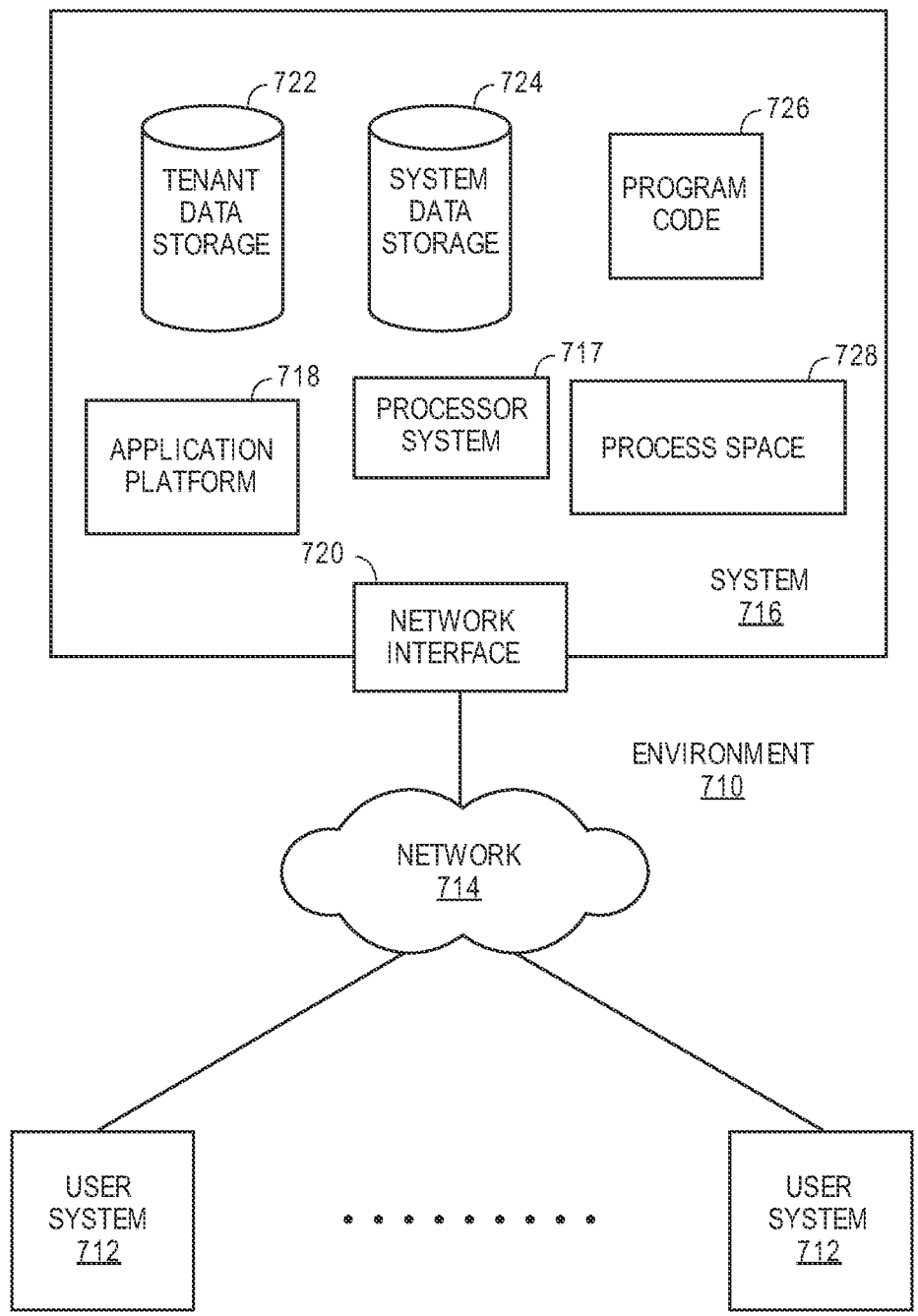
FIG. 7 illustrates a block diagram of an environment where an on-demand database service might be used.

FIG. 7 illustrates a block diagram of an environment 710 wherein an on-demand database service might be used. Components within environment 710 may belong to different layers (e.g., compute, management) and may communicate as described above. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in herein FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein.

A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714.

Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
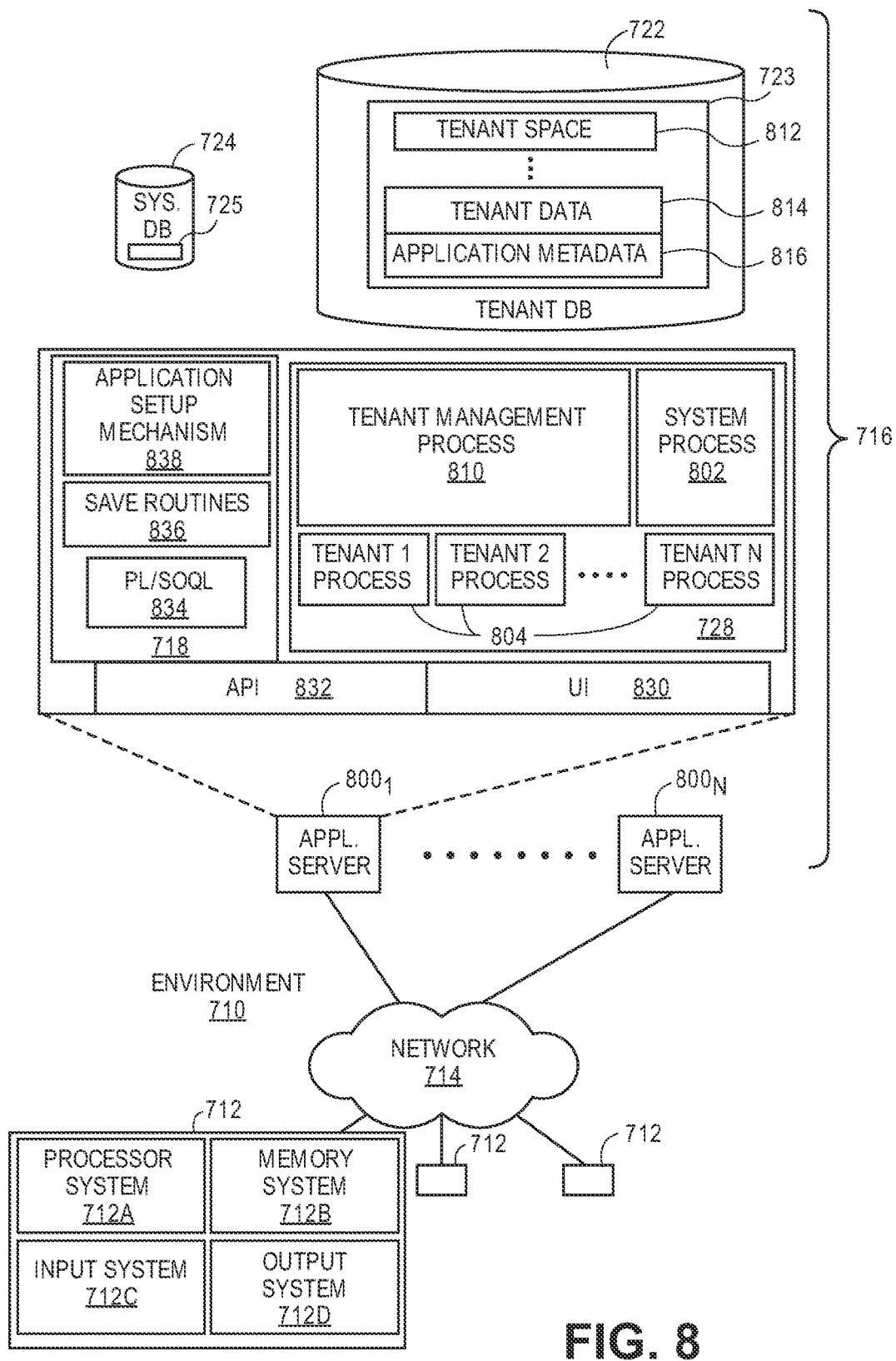
FIG. 8 illustrates a block diagram of an environment where an on-demand database service might be provided.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$500_N$, system process space 802, tenant process spaces 804, tenant management process space 810, tenant storage space 812, tenant data 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724.

Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage spaces 812, which can be either a physical arrangement and/or a logical arrangement of data. Within each tenant storage space 812, tenant data 814 and application metadata 816 might be similarly allocated for each user. For example, a copy of a user's most recently used (MRU) items might be stored to tenant data 814. Similarly, a copy of MRU items for an entire organization that is a tenant might be stored to tenant storage space 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processor, are configurable to cause the one or more processors to:
   maintain, with the one or more processors and in a database, information corresponding to multiple versions of a file, wherein the information comprises one or more of the multiple versions of the file and change data associated with the one or more versions of the file and the change data further comprises at least a number of changes and corresponding types of changes for associated versions of the file;
   present, with the one or more processors and in response to a request, a graphical user interface (GUI) comprising at least a timeline with entries corresponding to one or more versions of the file, wherein the entries have at least a graphical representation of changes made and wherein the graphical representation comprise graphical characteristics of the entries that vary depending on the number of changes and the types of changes;
   provide a mechanism to select an earlier version of the file through the GUI; and
   revert to the selected earlier version of the file if no dependencies exist that would result in the selected earlier version having reduced functionality, wherein the version control system operates within an on-demand services environment and monitors dependencies so that reversion to previous versions does not result in a non-functional system.

2. The non-transitory computer-readable medium of claim 1 further comprising instructions that, when executed by the one or more processors, cause the one or more processors to analyze earlier versions of the file to determine whether dependencies exist that would result in the selected earlier version having reduced functionality, wherein the earlier version corresponds to digital data for a tenant in a plurality of tenants to software instances, each tenant of the plurality of tenants comprising a group of users who share a common access with a specific set of privileges to a software instance of at least one application.

3. The non-transitory computer-readable medium of claim 1 wherein the file comprises a source code file.

4. The non-transitory computer-readable medium of claim 3 wherein the source code file corresponds to digital data for a tenant in a plurality of tenants to software instances, each tenant of the plurality of tenants comprising a group of users who share a common access with a specific set of privileges to a software instance of at least one application.

5. The non-transitory computer-readable medium of claim 1 wherein the file comprises an executable code file.

6. The non-transitory computer-readable medium of claim 5 wherein the executable code file corresponds to digital data for a tenant in a plurality of tenants to software instances, each tenant of the plurality of tenants comprising a group of users who share a common access with a specific set of privileges to a software instance of at least one application.

7. The non-transitory computer readable medium of claim 1 wherein the file comprises a word processing file.

8. The non-transitory computer readable medium of claim 1 wherein the request is in response to user input.

9. A method comprising:
   maintaining, with one or more processors and in a database, information corresponding to multiple versions of a file, wherein the information comprises one or more of the multiple versions of the file and change data associated with the one or more versions of the file and the change data further comprises at least a number of changes and corresponding types of changes for associated versions of the file;
   presenting, with the one or more processors and in response to a request, a graphical user interface (GUI) comprising at least a timeline with entries corresponding to one or more versions of the file, wherein the entries have at least a graphical representation of changes made and wherein the graphical representation comprise graphical characteristics of the entries that vary depending on the number of changes and the types of changes;
   providing a mechanism to select an earlier version of the file through the GUI; and
   reverting to the selected earlier version of the file if no dependencies exist that would result in the selected earlier version having reduced functionality, wherein the version control system operates within an on-demand services environment and monitors dependencies so that reversion to previous versions does not result in a non-functional system.

10. The method of claim 9 further comprising analyzing earlier versions of the file to determine whether dependencies exist that would result in the selected earlier version having reduced functionality, wherein the earlier version corresponds to digital data for a tenant in a plurality of tenants to software instances, each tenant of the plurality of tenants comprising a group of users who share a common access with a specific set of privileges to a software instance of at least one application.

11. The method of claim 9 wherein the file comprises a source code file.

12. The method of claim 11 wherein the source code file corresponds to digital data for a tenant in a plurality of tenants to software instances, each tenant of the plurality of tenants comprising a group of users who share a common access with a specific set of privileges to a software instance of at least one application.

13. The method of claim 9 wherein the file comprises an executable code file.

14. The method of claim 13 wherein the executable code file corresponds to digital data for a tenant in a plurality of tenants to software instances, each tenant of the plurality of tenants comprising a group of users who share a common access with a specific set of privileges to a software instance of at least one application.

15. The method of claim 9 wherein the file comprises a word processing file.

16. The method of claim 9 wherein the request is in response to user input.

17. A system for managing digital data for a plurality of tenants to software instances, each tenant of the plurality of tenants comprising a group of users who share a common access with a specific set of privileges to a software instance of at least one application, the system to:

maintain, with the one or more processors and in a database, information corresponding to multiple versions of a file, wherein the information comprises one or more of the multiple versions of the file and change data associated with the one or more versions of the file and the change data further comprises at least a number of changes and corresponding types of changes for associated versions of the file;

present, with the one or more processors and in response to a request, a graphical user interface (GUI) comprising at least a timeline with entries corresponding to one or more versions of the file, wherein the entries have at least a graphical representation of changes made and wherein the graphical representation comprise graphical characteristics of the entries that vary depending on the number of changes and the types of changes;

provide a mechanism to select an earlier version of the file through the GUI; and revert to the selected earlier version of the file if no dependencies exist that would result in the selected earlier version having reduced functionality, wherein the version control system operates within an on-demand services environment and monitors dependencies so that reversion to previous versions does not result in a non-functional system.

18. The system of claim 17 further configured to analyze earlier versions of the file to determine whether dependencies exist that would result in the selected earlier version having reduced functionality, wherein the earlier version corresponds to digital data for a tenant in a plurality of tenants to software instances, each tenant of the plurality of tenants comprising a group of users who share a common access with a specific set of privileges to a software instance of at least one application.

19. The system of claim 17 wherein the file comprises a source code file.

20. The system of claim 17 wherein the file comprises an executable code file.

* * * * *